(No Model.)
A. H. WINNER.
BICYCLE ATTACHMENT.
No. 559,652. Patented May 5, 1896.
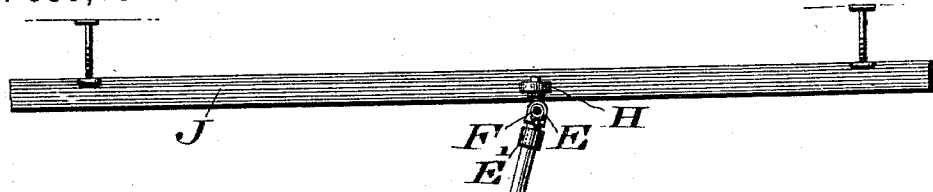
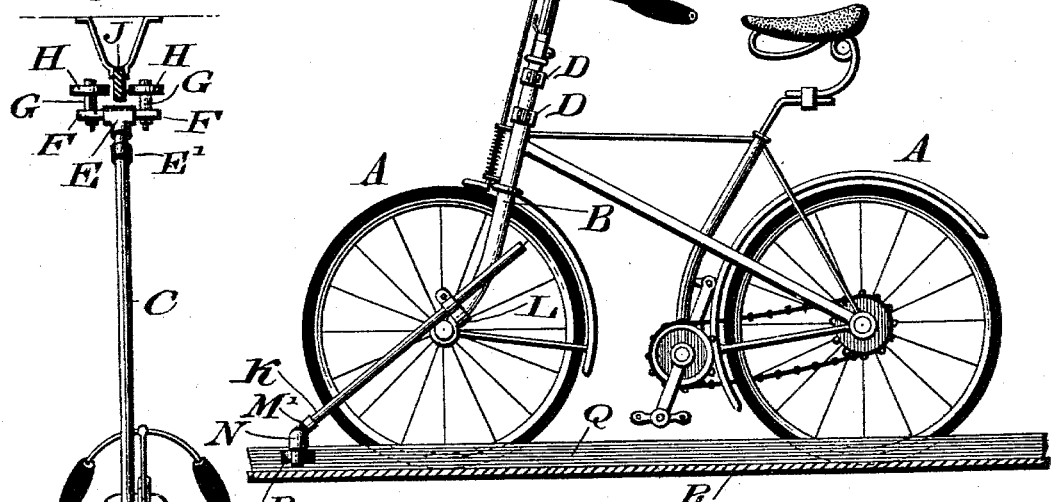
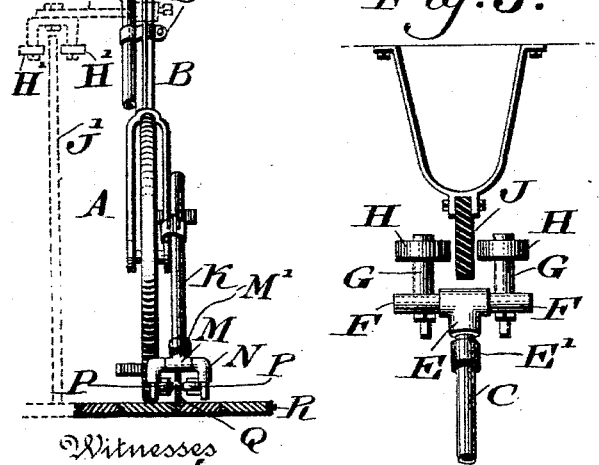
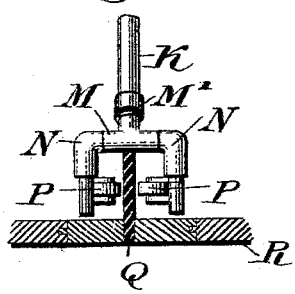
Witnesses
O. F. Eagle
Wm. C. Wiedersheim
Inventor
Arthur H. Winner
By his Attorney
John A. Wiedersheim

UNITED STATES PATENT OFFICE.

ARTHUR H. WINNER, OF SMITH'S LANDING, NEW JERSEY.

BICYCLE ATTACHMENT.

SPECIFICATION forming part of Letters Patent No. 559,652, dated May 5, 1896.

Application filed September 12, 1894. Serial No. 522,787. (No model.)

*To all whom it may concern:*

Be it known that I, ARTHUR H. WINNER, a citizen of the United States, residing at Smith's Landing, in the county of Atlantic, State of New Jersey, have invented a new and useful Improvement in Bicycle Attachments, which improvement is fully set forth in the following specification and accompanying drawings.

My invention consists of an attachment to a bicycle for the purpose of guiding and sustaining the same in upright position. For this purpose I employ a standard and an arm, which are attached to the frame of a bicycle and provided with rollers adapted to contact with suitable guides above or at the side of and below said bicycle, all as will be hereinafter set forth.

Figure 1 represents a side elevation of a bicycle attachment embodying my invention and a bicycle to which the same is applicable. Fig. 2 represents a front elevation of the same. Figs. 3 and 4 represent detail views of the upper and lower portions of the attachment, respectively.

Similar letters of reference indicate corresponding parts in the several figures.

Referring to the drawings, A designates a bicycle, and B designates the fork or front portion of the frame thereof.

C designates a standard, which is attached to the upper portion of the frame B by means of the clips or clamps D, said standard being out of the way of the steering and braking apparatus.

E designates a T or coupling, which is attached to the upper extremity of the standard C, and to which is secured the cross-piece F, to which are attached the vertical journals G G, on which are rotatably secured in any suitable manner the rollers H H.

J designates an elevated rail which is suitably supported above the bicycle, said rail extending longitudinally in the direction of the movement of the bicycle and being located at such a height relative to the rollers H that one of the latter bears on each side of the same.

K designates a depending arm, attached in the present instance to the bicycle-fork by the clamp or clips L.

M designates a T or coupling, and N designates elbows attached to the latter. P designates rollers which revolve on journals supported from said elbows in any suitable manner, said rollers being located on each side of the rail Q, which is attached to the floor R, on which the bicycle runs.

It will be noticed that the sections of the standard C and arm K are preferably attached to opposite sides of the bicycle-frame and that the bars or guides J and Q are also on opposite sides of the bicycle, the rollers H and P adjacent thereto being slightly out of contact with said guides, and as the attachment is made principally of sections of pipe or tubing the parts can be cheaply and readily assembled and the rollers can be adjusted to different heights by adjusting the sections C and K in the clips, as is evident, it being noticed that the bicycle-wheels run on the floor R, so that no change in the bicycle as such is required for the application of the guiding devices, it being also evident that an inexperienced person can easily ride the bicycle, as the latter is readily sustained in an upright position and prevented from overturning. If desired, the elevated rail or guide J may be lowered, so as to be at the side of the bicycle, as at J'. In this latter case an arm C' is adjustably attached to the steering-rod of the bicycle and provided with rollers H', which are adapted to be guided on said rail J', as shown dotted at the left of Fig. 2.

The coupling M may be connected with the arm K by the swivel-joint M', so as to permit the rollers P to readily follow the rail when of curved form.

The coupling E may be connected with the standard C by the swivel-joint E', which has the same function as the aforesaid swivel-joint M', as is evident.

Having thus described my invention, what I claim as new, and desire to secure by Letters Patent, is—

1. A bicycle attachment comprising rollers journaled in supports detachably secured to and extended above and below the bicycle-frame, said rollers being adapted to contact with guides above and below the bicycle, substantially as described.

2. The herein-described bicycle attachment, consisting of the standard C, having connected therewith the cross-piece F, the latter carrying the journals G and the rollers H, said rollers being adapted to contact with the guide or rail J, in combination with the arm K, on the extremity of which are journaled the rollers P, which are adapted to contact with the guide or rail Q, said standard C and the arm K being secured to the frame of a bicycle, and the above parts being combined substantially as described.

3. A bicycle, to the frame of which are attached the standard C and the arm K, carrying the rollers H and P, in combination with the guides J and Q, respectively on and above the floor R, substantially as described.

4. A bicycle attachment consisting of a rod adapted to be detachably secured to the frame of a bicycle, a bearing-piece secured to said rod, and rollers journaled on said bearing-piece, adapted to contact with opposite sides of a rail, said parts being combined substantially as described.

5. A bicycle having rods detachably connected with the frame thereof and provided with pieces having rollers journaled thereon, said rollers being adapted to contact with opposite sides of tracks above and below the bicycle-frame, said parts being combined substantially as described.

ARTHUR H. WINNER.

Witnesses:
JOHN A. WIEDERSHEIM,
E. H. FAIRBANKS.